United States Patent [19]

Sundstrom et al.

[11] Patent Number: 4,994,690
[45] Date of Patent: Feb. 19, 1991

[54] SPLIT LEVEL BUS

[75] Inventors: Ray D. Sundstrom, Chandler; Cleon Petty; Dwight D. Esgar, both of Tempe, all of Ariz.

[73] Assignee: Motorola, Inc., Schaumburg, Ill.

[21] Appl. No.: 471,581

[22] Filed: Jan. 29, 1990

[51] Int. Cl.⁵ ........................................ H03K 19/003
[52] U.S. Cl. .................................... 307/443; 307/475; 307/494; 375/36
[58] Field of Search ............... 375/36; 307/443, 454, 307/475, 494, 542, 264

[56] References Cited

U.S. PATENT DOCUMENTS

| | | | |
|---|---|---|---|
| 4,083,005 | 4/1978 | Looschen | 375/36 X |
| 4,341,927 | 7/1982 | Shinoi et al. | 375/36 X |
| 4,578,594 | 3/1986 | Santos | 307/494 X |
| 4,734,919 | 3/1988 | Tae | 375/36 X |
| 4,748,346 | 5/1988 | Emori | 307/475 X |
| 4,797,904 | 1/1989 | Dekker et al. | 375/36 X |
| 4,825,402 | 4/1989 | Jalali | 375/36 X |
| 4,931,667 | 6/1990 | Pfennings et al. | 307/443 |
| 4,941,153 | 7/1990 | Kelley et al. | 375/36 |

Primary Examiner—David Hudspeth
Attorney, Agent, or Firm—Michael D. Bingham

[57] ABSTRACT

A split level differential bus having first and second signals at first and second lines, respectively, for transmitting data from a typical driver to a typical receiver, includes a first independent voltage source for terminating the first line and a second independent voltage source for terminating the second line, the second independent voltage source providing a voltage level that is different from the voltage level provided by the first independent voltage source. A current switch circuit controlled by the driver for switching current from the first line to the second line. A level shifting circuit coupled between the first line and the receiver for level shifting the first signal by a predetermined voltage.

9 Claims, 1 Drawing Sheet

SPLIT LEVEL BUS

BACKGROUND OF THE INVENTION

The present invention relates to buses and more particularly, to high speed differential data buses.

Many applications comprise a driver circuit that produces a logic high or a logic low at its output which is to be transmitted over a differential bus, which is typically a data bus, an address bus or an arbitration bus, and will be received at the other end of the bus by a receiver circuit. Furthermore, the differential bus may be coupled to more than one driver circuit which can cause problems when one driver forces the inverting bus line to a logic high and another driver forces the non-inverting bus line to a logic high also. Therefore, the receiver circuit attempts to receive a logic high-high differential signal which typically produces oscillation in the receiver. In addition, standard driver circuits usually are capable of driving both of its outputs to a logic low thereby effectively disabling the driver circuit from the differential bus. This logic low-low condition on both the inverting and non-inverting lines also causes oscillation in the receiver and requires excess power consumption from the driver.

Thus, a need exists for a differential bus that provides true differential signals at all times and, thus, abating the occurrence of a logic high-high arbitration problem or a low-low disabled state.

SUMMARY OF THE INVENTION

Accordingly, it is an object of the present invention to provide an improved differential bus that will provide true differential signals and, thus, abating the occurrence of a logic high-high or low-low state.

Another object of the present invention is to provide a differential bus that will operate successfully at high frequencies.

In carrying out the above and other objects of the present invention, there is provided a split level differential bus having first and second signals at first and second lines, respectively, for transmitting data from a driver to a receiver, comprising the first line being terminated by a first independent voltage source and the second line being terminated by a second independent voltage source which provides a voltage level that is different from the voltage level provided by the first independent voltage source; current switch circuit controlled by the driver for switching current from the first line to the second line; and level shifting circuit coupled to the receiver for level shifting the first signal by a predetermined voltage.

The above and other objects, features and advantages of the present invention will be better understood from the following detailed description taken in conjunction with the accompanying drawings.

DETAILED DESCRIPTION OF THE INVENTION

Figure 1:
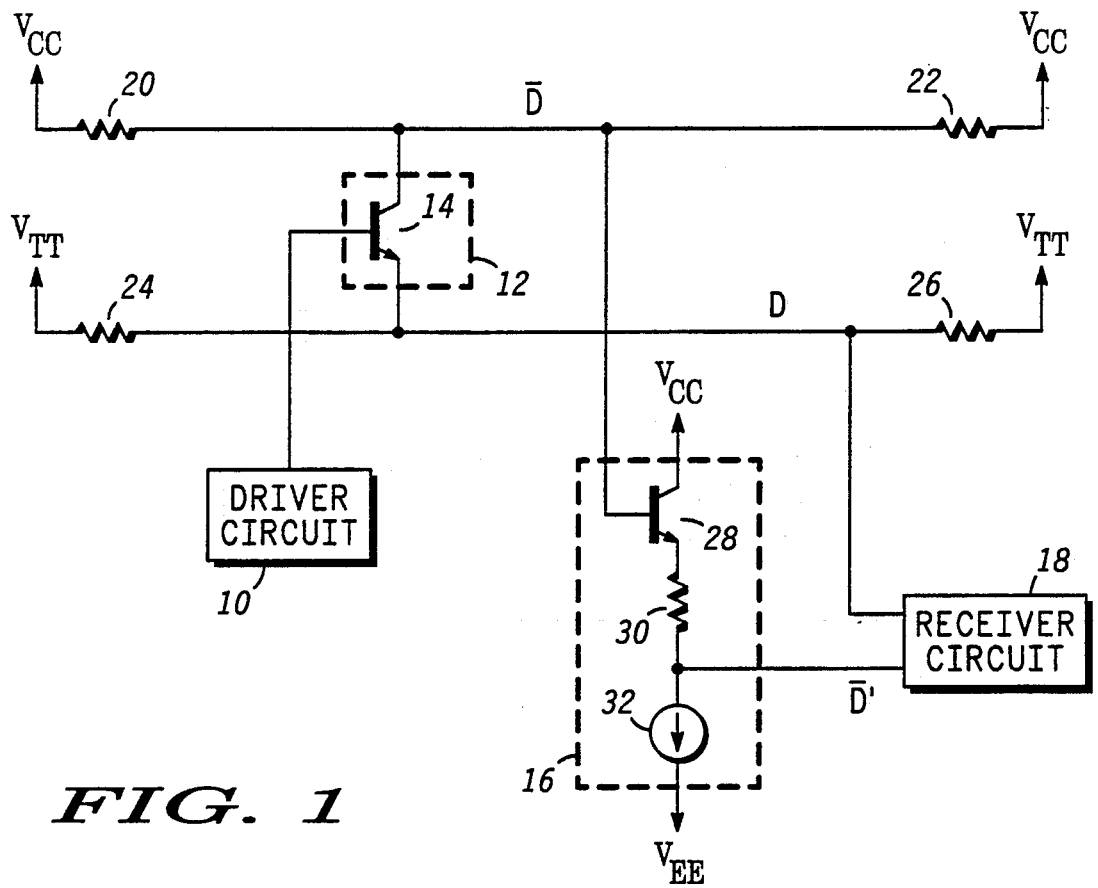
FIG. 1 is a partial schematic diagram illustrating the preferred embodiment of the present invention.

Referring to FIG. 1, there is illustrated a partial schematic diagram of the preferred embodiment of the present invention comprising driver circuit 10 having an output coupled to current switch circuit 12 which is comprised of transistor 14 which has a collector coupled to a first line ($\overline{D}$), a base coupled to driver circuit 10 and an emitter coupled to a second line ($\overline{D}$), wherein D and $\overline{D}$ form a differential transmission bus. It is understood that current switch circuit 12 can be comprised of any device capable of passing current from the first line to the second line such as a p-channel or an n-channel FET. The preferred embodiment of the present invention further includes level shifting circuit 16 coupled between the first line and receiver circuit 18. The first line, which typically transmits inverting data, is terminated at both extremes of the bus through resistors 20 and 22, respectively, to a first independent voltage source which operates at potential $V_{CC}$. The second line, which typically transmits non-inverting data, is also terminated at both extremes of the bus through resistors 24 and 26, respectively, to a second independent voltage source which operates at potential $V_{TT}$, the second independent voltage source providing a voltage level that is different from, and in particular, less than the voltage level provided by the first independent source. Resistors 20, 22, 24 and 26 are typically chosen to match a predetermined controlled impedance associated with the inverting and non-inverting lines as understood.

Level shifting circuits 16 includes transistor 28 having a collector coupled to operating potential $V_{CC}$, a base coupled to the first line, and an emitter coupled to a first input of receiver circuit 18 through resistor 30 and to operating potential $V_{EE}$ through the series combination of resistor 30 and independent current source 32. Furthermore, receiver circuit 18 has a second input coupled to the second line. It is understood that the voltage level of the first independent voltage source can be made less than that provided by the second independent voltage source, if proper level shifting is performed.

Driver circuit 10 can be comprised of any typical driver circuit that is capable of providing a logic high and a logic low at its output. Furthermore, receiver circuit 18 can be comprised of any typical receiver circuit that is capable of processing differential signals occurring at its inputs.

In operation, driver circuit 10 provides a logic high or low at its output which turns on or off transistor 14, respectively. Let us first assume that a logic low appears at the output of driver circuit 10 which has the effect of turning off transistor 14. Since transistor 14 is off, substantially zero current flows from the inverting data line to the non-inverting data line. Therefore, the inverting data line is maintained at voltage potential $V_{CC}$ by the first independent voltage source while the non-inverting data line is maintained at a voltage potential $V_{TT}$ by the second independent voltage source. This can be referred to as the passive state such that when a logic low appears at the output of driver circuit 10, the inverting data line will be a logic high and the non-inverting data line will be a logic low as desired. In the passive state it is clear that a logic low-low or high-high condition never occurs on the inverting and non-inverting lines, respectively, since the lines are substantially uncoupled and terminated to distinct independent voltage sources, $V_{CC}$ and $V_{TT}$, respectively.

Figure 2:
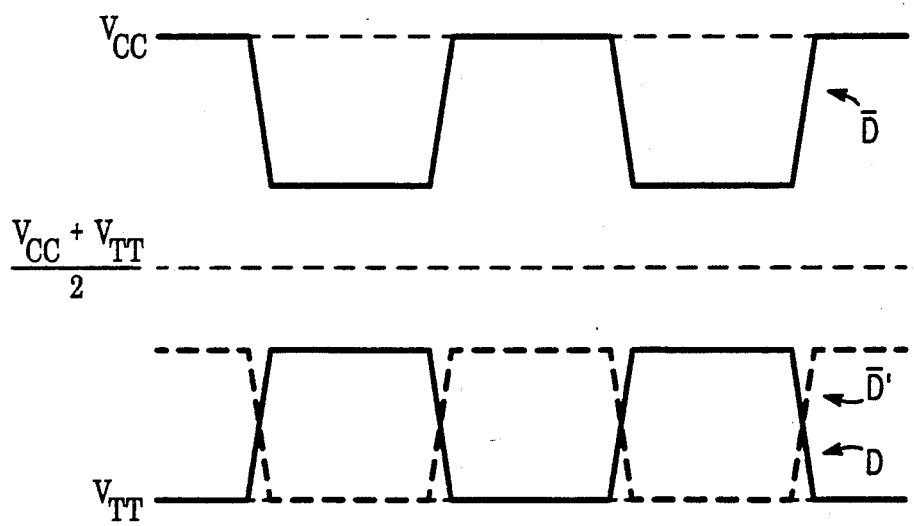
FIG. 2 illustrates in graphical form typical signals for the preferred embodiment of the present invention.

Now assume that a logic high appears at the output of driver circuit 10 which has the effect of switching on transistor 14. Since transistor 14 is on, current is allowed to flow from the inverting data line to the non-inverting data line through the collector and emitter of transistor 14. Since substantially equal currents flow through the collector and emitter of transistor 14 and resistors 20, 22, 24 and 26 are substantially equal to one another, the voltage level on the inverting data line will drop from voltage potential $V_{CC}$ to a voltage level that is substantially equal to $(V_{CC}+V_{TT})/2+V_{CE(Q14)}/2$ where $V_{CE}$ is the voltage drop between the collector and emitter of transistor 14, as illustrated in FIG. 2 by waveform $\overline{D}$. Furthermore, the voltage level on the non-inverting data line will rise from voltage potential $V_{TT}$ to a voltage level that is substantially equal to $(V_{CC}+V_{TT})/2-V_{CE(Q14)}/2$, also illustrated in FIG. 2 by waveform D. As can be seen from FIG. 2, the inverting and non-inverting data lines never overlap each other thereby producing a split level bus which can minimize noise on the bus. This split level bus further shows that a logic low-low will not occur when many drivers, coupled to the bus, are disabled or a high-high will not occur when multiple drivers are enabled. Also, since current only flows through the inverting line to the non-inverting line, rather than through ground, the noise pickup is further minimized.

After looking at FIG. 2, it is clear that one of the signals D or $\overline{D}$ must be level shifted before it is sent to receiver circuit 18. The inverting line, $\overline{D}$, has been chosen to be level shifted so as to produce a typical differential signal at the inputs of receiver circuit 18, but it is understood that the non-inverting line could have been level shifted to also produce differential signals. The level shifting of the inverting line is performed by creating a predetermined voltage drop across the base emitter junction of transistor 28 and resistor 30 as set up by independent current source 32. The predetermined voltage drop will shift $\overline{D}$ to a voltage range that is substantially equivalent to the voltage range of D as shown in FIG. 2 by the dotted waveform designated by $\overline{D}'$. Once the level shifting has been performed, receiver circuit 18 can be comprised of any typical receiver circuit that is capable of accepting differential signal inputs. Furthermore, it is understood that level shifting circuit can be comprised of any circuitry that is capable of providing a predetermined voltage drop.

It is worth noting that many drivers can be coupled to the inverting and non-inverting bus lines, D and $\overline{D}$ respectively, whereby some provide a logic high at its output while others provide a logic low at its output, such that a logic high-high or low-low condition will never occur on the inverting and non-inverting data lines for the same reasons aforedescribed.

By now it should be appreciated that there has been provided a novel differential bus that will provide true differential signals such that the occurrence of a logic high-high or low-low on the inverting and non-inverting lines will be abated.

What is claimed is:

1. A split level differential bus having true differential signals at first and second lines, respectively, and a controlled impedance for transferring differential data from a driver circuit which provides a logic low or a logic high output, to a receiver circuit which has a first input coupled to the first line and a second input coupled to the second line, comprising:

the first line being terminated to a first independent voltage source while the second line is terminated to a second independent voltage source which provides a voltage level different than that provided by the first independent voltage source, current switch means responsive to the logic high output of the driver circuit for switching current from the first line to the second line; and level shifting means coupled between the first line and the first input of the receiver circuit for level shifting the signal at the first line by a predetermined voltage.

2. The split level bus according to claim 1 wherein said current switch means includes:

a transistor having a collector coupled to the first line, a base coupled to said output of said driver circuit and an emitter coupled to the second line.

3. The split level bus according to claim 2 wherein said level shifting means includes:

a transistor having a collector coupled to a source potential, a base coupled to the first line, and an emitter coupled to the first input of the receiver circuit by a first resistor and to a third independent voltage source by the series combination of said first resistor and an independent current source.

4. An improved differential bus having true differential signals at first and second lines respectively, and a controlled impedance for transferring differential data from a driver circuit to a receiver circuit, the driver circuit providing a logic low or a logic high output and the receiver circuit having a first input coupled to the first line and a second input coupled to the second line, wherein the improvement comprises:

current switch means responsive to the logic high output of the driver circuit for switching current from the first line to the second line;

level shifting means coupled between the first line and the first input of the receiver circuit for level shifting the signal at the first line by a predetermined voltage;

a first independent voltage source for terminating the first line; and a second independent voltage source for terminating the second line, said first independent voltage source providing a voltage level different than the voltage level provided by said second independent voltage source.

5. The improved differential bus according to claim 4 wherein said current switch means includes:

a transistor having a collector coupled to the first line, a base coupled to said output of said driver circuit, and an emitter coupled to the second line.

6. The improved differential bus according to claim 5 wherein said level shifting means includes:

a transistor having a collector coupled to a source potential, a base coupled to the first line, and an emitter coupled to the first input of the receiver circuit by a first resistor and to a third independent voltage source by the series combination of said first resistor and an independent current source.

7. A split level bus system for transmitting true differential signals at first and second lines, respectively, comprising:

a first independent voltage source for terminating the first line;

a second independent voltage source for terminating the second line, said first independent voltage source providing a voltage level different than the voltage level provided by said second independent voltage source;

driver means for providing a logic low or a logic high output;

current switch means for switching current from the first line to the second line in response to said logic high output of said driver means;

receiver means for accepting differential signals having a first input coupled to the first line and second input coupled to the second line; and level shifting means coupled between the first line and said first input of said receiver means for level shifting the signal at the first line by a predetermined voltage.

8. The split level system bus according to claim 7 wherein said current switch means include:

a transistor having a collector coupled to the first line, a base coupled to said output of said driver means, and an emitter coupled to the second line.

9. The split level bus system according to claim 8 wherein said level shifting means includes:

a transistor having a collector coupled to a source potential, a base coupled to the first line, and an emitter coupled to said first input of said receiver means by a first resistor and to a third independent voltage source by the series combination of said first resistor and an independent current source.

* * * * *